United States Patent [19]

Johnson

[11] Patent Number: 4,822,013

[45] Date of Patent: Apr. 18, 1989

[54] APPARATUS FOR SECURING A COMPONENT

[75] Inventor: Thomas K. Johnson, Bristol, England

[73] Assignee: Rolls-Royce plc, London, England

[21] Appl. No.: 127,474

[22] Filed: Dec. 2, 1987

[30] Foreign Application Priority Data

Dec. 11, 1986 [GB] United Kingdom ............... 8629596

[51] Int. Cl.$^4$ .............................................. B25B 1/00
[52] U.S. Cl. ................................................... 269/7
[58] Field of Search ..................... 269/7, 266; 409/163, 409/164, 174; 156/91, 289, 155; 51/216 LP, 216 R, 277; 264/274

[56] References Cited

U.S. PATENT DOCUMENTS 3,361,019  1/1968  Weiskopf ............................... 269/7

FOREIGN PATENT DOCUMENTS 619321  1/1976  U.S.S.R. ................................ 269/7
1115880  9/1984  U.S.S.R. ................................ 269/7

Primary Examiner—Robert C. Watson
Attorney, Agent, or Firm—Oliff & Berridge

[57] ABSTRACT

An apparatus for securing a component, comprising a casing 12 having two portions 12a, 12b between which a portion of the component 38 is positioned. The casing 12 is provided with end walls 34,36 which extend towards the component but terminate just short thereof by a predetermined amount. The position of the component 38 is fixed relative to features 28 provided on the casing 12 prior to injecting a location material into the interior of said casing 12. The material preferably has a high resistance to extrusion and acts to locate the component 38 during machining.

7 Claims, 1 Drawing Sheet

APPARATUS FOR SECURING A COMPONENT

This invention relates to an apparatus and method of securing a component and is particularly applicable to securing articles of complex form which require machining.

Components such as for example turbine blades and nozzle guide vanes often require machining operations to be undertaken on one or more of their end portions. The aerofoil portion of the blade is generally used to mount the blade in a jig during the machining operations. The aerofoil section is generally quite complex in shape and is therefore difficult to mount in the jig. Further to this, difficulty is often experienced in accurately locating the end portions relative to features on the jig which are used as reference points during the machining operation.

This invention attempts to overcome the above mentioned problems by providing an apparatus and method of securing a component which can accommodate complex shapes and allows accurate location of those portions of the component requiring machining relative to reference features located on said apparatus.

The present invention will now be more particularly described by way of example only with reference to the accompanying drawings, in which.

Figure 1:
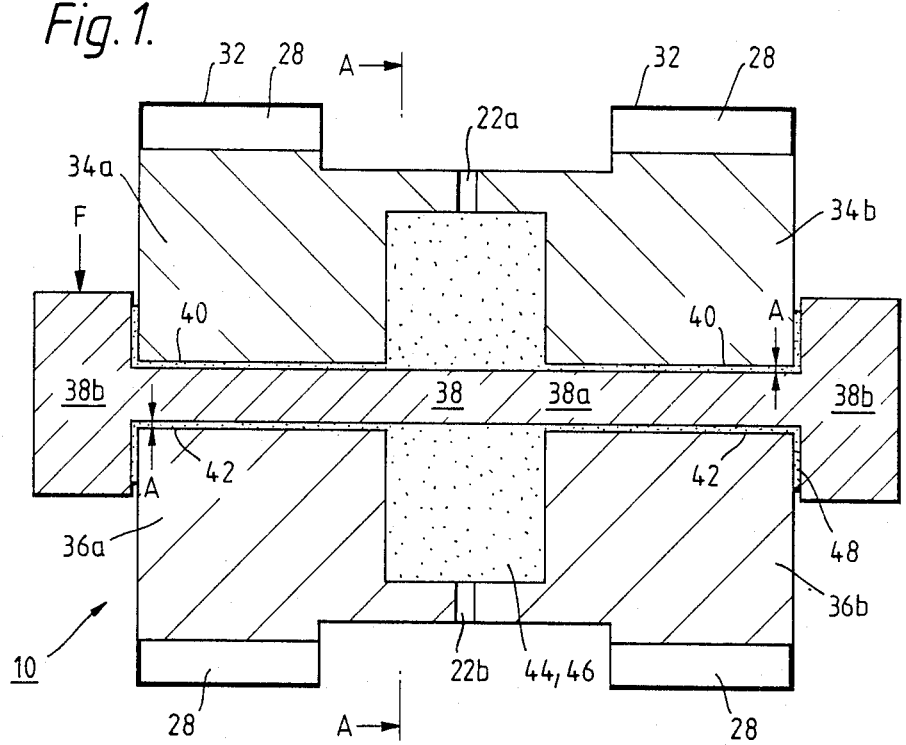
FIG. 1 is a cross-sectional view of the apparatus and a component held therein.

Referring to the drawings, in general, but particularly FIG. 1, the apparatus 10 comprises a casing 12 having two portions 12a and 12b each of which is shaped to communicate with each other along two common edges 14 and 16 respectively. Each portion 12a, 12b is provided with retaining features in the form of cut outs 18a, 18b on the inner surfaces 20a and 20b respectively, and one or more injection holes shown at 22a and 22b. Location features in the form of, for example, pegs 24 and holes 26 may be provided in the common edges 14 and 16 to aid location of the two portions 12a, 12b relative to each other. The casing 12 is provided with at least one reference/location feature 28 on its outer surface 30 which comprises one or more accurately manufactured surfaces shown collectively at 32.

Figure 2:
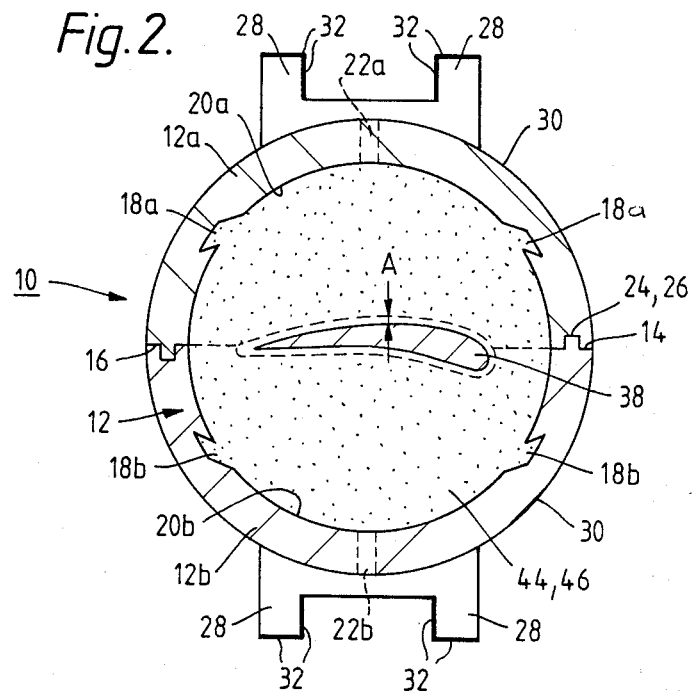
FIG. 2 is a cross sectional view of the apparatus and component taken in the direction of arrows A—A in FIG. 1.

Each portion 12a, 12b is further provided with a pair of end walls 34a,b and 36a,b respectively. Each wall 34,36 extends towards the component 38 to be mounted but terminates short thereof by a predetermined amount A. The end faces 40,42 of said walls 34,36 are profiled (best seen in FIG. 2) to accommodate the component 38 whilst maintaining the constant predetermined gap A.

In operation a component 38 having a mid portion 38a and at least one end portion 38b is positioned with its mid portion 38a sandwiched between the suitably profiled walls 34,36, such that the end portion 38b protrudes beyond one of said walls 34,36 so as to be accessable for machining. The position of the component 38 is adjusted to locate it accurately relative to the reference/location feature surfaces 32 before the interior 44 of the casing 12 is filled with a support material 46, via the injection holes 22a,22b and solidifies therein. The material is preferably one which is capable of flowing into the interior of the casing 44 and setting such that it accurately locates the component 38 in its adjusted position. The support material enters the cavities 18a, 18b in the casing 12 and thereby holds the casing together, and retains the relative positions of the casing and support material. It will be appreciated that a small portion of the material 46 will pass through the gap A and escape from the interior of the casing 44. The location of the component 38 may be further enhanced by reducing the gap 48 between the walls 34,36 and the end portion of the component 38b such that the material 46 comes into contact with both the walls 34,36 and the end portion 38b over at least part of said gap. A gap 48 in the region of 1mm has been found to be effective.

During any subsequent machining operation, forces F created by the action of the cutter (not shown) attempt to displace the component 38 and deform the supporting material 46. The material 46 contained within the casing 12 can only be deformed by passing through gaps A and 48. It will therefore be appreciated that the load carrying ability of the material is greatly enhanced by reducing said gaps to a minimum as this creates a greater resistance to flow.

The load carrying ability of the material 46 may be further enhanced by selecting a material having a high resistance to extrusion at the machining temperature.

After machining, the component 38 is removed from the casing 12 by removing the support material. With support materials which will melt this is achieved by heating the material 46 above its melting temperature and allowing it to pass back through the injection holes 22a,b. Further holes (not shown) may be provided to aid this process.

With support materials which can be oxidised or carbonised this is achieved by heating in oxidising or reducing environments. With support materials which can only be removed by dissolving them, the support material is exposed to a solvent.

Examples of suitable materials include waxes, especially Green Rigidax, plastics and epoxy resins, all of which possess high resistance to extrusion.

I claim:

1. An apparatus for securing a component for machining, comprising:

a casing, having two portions, each portion being provided with an end wall having an interior end face, said end wall extending towards the component such that said end faces confront said component but are spaced therefrom by a predetermined amount thereby to define a first gap, at least one of said portions being provided with a cavity which communicates with said first gap and further being provided with a reference feature, the apparatus being provided with an exterior end portion which is profiled to match the profile of an end portion of the component and is spaced therefrom by a predetermined amount thereby to define a second gap; and a support material which at least partially fills said cavity and the gap.

2. An apparatus for securing a component having a mid portion and two end portions for machining, the apparatus comprising:

a casing, having two portions, each portion being provided with an end wall having an interior end face, said end wall extending towards the component such that said end faces confront said component but are spaced therefrom by a predetermined amount thereby to define a first gap, at least one of said portions being provided with a cavity which communicates with said gap and further being provided with a reference feature, the apparatus being provided with two end portions each of which is profiled to match the profile of an exterior end portion of the component and is spaced therefrom by a predetermined amount, thereby to define a second gap; and a support material which at least partially fills said cavity and the gaps.

3. An apparatus according to claim 1, in which the gap between the component and the apparatus is 1 mm wide.

4. An apparatus according to claim 1 in which the support material is Rigidax wax.

5. An apparatus according to claim 1 in which the casing is provided with means for retaining the support material relative to said portions.

6. An apparatus according to claim 1 in which the cavity includes one or more cut outs formed in each casing portion in which a portion of the support material is situated.

7. An apparatus according to claim 1 in which the casing is provided with a reference feature.

* * * * *